United States Patent
Ahn

(10) Patent No.: US 9,229,279 B2
(45) Date of Patent: Jan. 5, 2016

(54) LIQUID CRYSTAL DISPLAY DEVICE COMPRISING A PLURALITY OF SEAL COLUMN ORGANIC LAYERS BURIED IN A SEAL

(75) Inventor: Seon-Hong Ahn, Yongin (KR)

(73) Assignee: Samsung Display Co., Ltd., Samsung-ro, Giheung-Gu, Yongin-si, Gyeonggi-Do (KR)

(*) Notice: Subject to any disclaimer, the term of this patent is extended or adjusted under 35 U.S.C. 154(b) by 812 days.

(21) Appl. No.: 13/178,213

(22) Filed: Jul. 7, 2011

(65) Prior Publication Data
US 2012/0033162 A1   Feb. 9, 2012

(30) Foreign Application Priority Data
Aug. 9, 2010 (KR) .......................... 10-2010-0076627

(51) Int. Cl.
G02F 1/1339 (2006.01)
G02F 1/1335 (2006.01)

(52) U.S. Cl.
CPC ........ *G02F 1/1339* (2013.01); *G02F 1/133512* (2013.01)

(58) Field of Classification Search
CPC .............. G02F 1/133512; G02F 2001/133388; G02F 1/1339
USPC ................................................. 349/153–157
See application file for complete search history.

(56) References Cited

U.S. PATENT DOCUMENTS

| 6,570,639 | B1* | 5/2003 | Manabe et al. ............... 349/190 |
| 7,253,131 | B2 | 8/2007 | Watanabe et al. |
| 2004/0070700 | A1* | 4/2004 | Sah et al. ........................ 349/54 |
| 2007/0139597 | A1* | 6/2007 | Shim et al. .................... 349/139 |
| 2008/0218679 | A1* | 9/2008 | Hong et al. ................... 349/155 |
| 2009/0290085 | A1* | 11/2009 | Chang et al. .................... 349/54 |

FOREIGN PATENT DOCUMENTS

| KR | 10-2003-0001572 | 1/2003 |
| KR | 10-2004-0017463 | 2/2004 |
| KR | 10-2005-0001783 | 1/2005 |
| KR | 100906926 B1 | 7/2009 |

\* cited by examiner

*Primary Examiner* — Paul Lee
(74) *Attorney, Agent, or Firm* — Robert E. Bushnell, Esq.

(57) ABSTRACT

A liquid crystal display (LCD) device having a first substrate and a second substrate, each having a surface opposite to each other and each including a seal region and a liquid crystal region. The first substrate structure having a black matrix on the surface of the first substrate opposite to the second substrate, a color filter next to the black matrix, a first electrode on the color filter, a first orientation film on the first electrode, and a number of seal column spacers on the black matrix. The second substrate structure having a circuit device disposed on the surface of the second substrate opposite to the black matrix, an organic layer disposed on the second substrate opposite to the color filter, a second electrode on the organic layer, and a second orientation film on the second electrode. The seal is in the seal regions between the first substrate structure and the second substrate structure. A liquid crystal layer fills a space between the first substrate structure and the second substrate structure in the liquid crystal region.

4 Claims, 13 Drawing Sheets

LIQUID CRYSTAL DISPLAY DEVICE COMPRISING A PLURALITY OF SEAL COLUMN ORGANIC LAYERS BURIED IN A SEAL

CLAIM OF PRIORITY

This application makes reference to, incorporates the same herein, and claims all benefits accruing under 35 U.S.C. §119 from an application earlier filed in the Korean Intellectual Property Office on Aug. 9, 2010 and there duly assigned Serial No. 10-2010-0076627.

BACKGROUND OF THE INVENTION

1. Field of the Invention

The general inventive concept generally relates to a liquid crystal display (LCD) device.

2. Description of the Related Art

LCD devices display images by controlling the molecular arrangement status of liquid crystals to vary the transmission or reflection amount of light according to optical anisotropy of the liquid crystals.

The above information disclosed in this Related Art section is only for enhancement of understanding of the background of the invention and therefore it may contain information that does not form the prior art that is already known to a person of ordinary skill in the art.

SUMMARY OF THE INVENTION

The present invention provides a liquid crystal display (LCD) device in which adhesion between a device substrate and a color filter substrate is enhanced even with a smaller black matrix region, and a method of manufacturing the LCD device.

According to an aspect of the present invention, there is provided a LCD device including: a first substrate and a second substrate, each having a surface opposite to each other and each including a seal region and a liquid crystal region; a first substrate structure including a black matrix on the surface of the first substrate opposite to the second substrate, a color filter next to the black matrix, a first electrode on the color filter, a first orientation film on the first electrode, and a plurality of seal column spacers on the black matrix; a second substrate structure including a circuit device disposed on the surface of the second substrate opposite to the black matrix, an organic layer disposed on the second substrate opposite to the color filter, a second electrode on the organic layer, and a second orientation film on the second electrode; a seal in the seal regions between the first substrate structure and the second substrate structure; and a liquid crystal layer filling a space between the first substrate structure and the second substrate structure in the liquid crystal region;

The LCD device may further include a column spacer between the first electrode and the second electrode.

The plurality of seal column spacers may be buried in the seal to tightly bind the first substrate structure and the seal.

The LCD device may further include a passivation layer on the circuit device and the second substrate, the passivation layer underlying the organic layer.

The seal column spacers and the column spacer may have a height of about 2 µm to about 5 µm. The first orientation film and the second orientation film may have a height of about 400 Å to about 1000 Å.

The seal may include a UV curable polymer.

According to another aspect of the present invention, there is provided a LCD device including: a first substrate and a second substrate, each having a surface opposite to each other and each including a seal region and a liquid crystal region; a first substrate structure including a black matrix on the surface of the first substrate opposite to the second substrate, a color filter next to the black matrix, a first electrode on the color filter, and a first orientation film on the first electrode; a second substrate structure including a circuit device disposed on the surface of the second substrate opposite to the black matrix, an organic layer disposed on the second substrate opposite to the color filter, a plurality of seal column organic layers on the circuit device; a second electrode on the organic layer, and a second orientation film on the second electrode; a seal disposed between the seal regions of the first substrate and the second substrate to bind the first substrate structure and the second substrate structure; and a liquid crystal layer filling a space between the first substrate structure and the second substrate structure in the liquid crystal region.

The plurality of seal column organic layers may be buried in the seal to tightly bind the second substrate structure and the seal.

The LCD device may further include a passivation layer on the circuit device and the second substrate, the passivation layer underlying the seal column organic layer and the organic layer.

The seal column organic layers may have a diameter of about 0.5 µm to about 1 µm and a height of about 1 µm to about 3 µm. The first orientation film and the second orientation film may have a height of about 400 Å to about 1000 Å.

According to another aspect of the present invention, there is provided a LCD device including: a first substrate and a second substrate, each having a surface opposite to each other and each including a seal region and a liquid crystal region; a first substrate structure including a black matrix on the surface of the first substrate opposite to the second substrate, a color filter next to the black matrix, a first electrode on the color filter, a first orientation film on the first electrode, and a plurality of seal column spacers on the black matrix; a second substrate structure including a circuit device disposed on the surface of the second substrate opposite to the black matrix, an organic layer disposed on the second substrate opposite to the color filter, a plurality of seal column organic layers on the circuit device, a second electrode on the organic layer, and a second orientation film on the second electrode; a seal disposed between the seal regions of the first substrate and the second substrate to bind the first substrate structure and the second substrate structure; and a liquid crystal layer filling a space between the first substrate structure and the second substrate structure in the liquid crystal region.

The plurality of seal column spacers and the plurality of seal column organic layers may be buried in the seal to tightly bind the first substrate structure and the second substrate structure with respect to the seal.

The LCD device may further include a passivation layer on the circuit device and the second substrate, the passivation layer underlying the seal column organic layers and the organic layer.

The seal column spacers may have a diameter of about 0.5 µm to about 2 µm and a height of about 2 µm to about 5 µm. The seal column organic layers may have a diameter of about 0.5 µm to about 1 µm, and a height of about 1 µm to about 3 µm. The first orientation film and the second orientation film may have a height of about 400 Å to about 1000 Å.

According to another aspect of the present invention, there is provided a method of manufacturing a LCD device, the method including preparing a first substrate and a second substrate, each having a seal region and a liquid crystal region. A first substrate structure may be formed by: forming a black matrix on the first substrate and forming a color filter in the liquid crystal region of the first substrate next to the black matrix; forming a first electrode on the color filter; forming a first orientation film on the first electrode; forming a plurality of seal column spacers on the black matrix in the seal region; and forming a seal covering the seal column spacers. Then, a second substrate structure may be formed by forming a circuit device on the second substrate; forming an organic layer in the liquid crystal region of the second substrate having the circuit device; forming a second electrode on the organic layer; and forming a second orientation film on the second electrode. Then, the first substrate structure and the second substrate structure are bound together. Finally, a liquid crystal layer may be formed in a space between the first substrate structure and the second substrate structure, in the liquid crystal region.

Optionally, the forming of the organic layer in the liquid crystal region of the second substrate may further include forming a plurality of seal column organic layers in the seal region of the second substrate.

Alternatively, instead of forming the plurality of seal column spacers on the black matrix in the seal region, a plurality of seal column organic layers may further be formed in the seal region of the second substrate after the organic layer is formed.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
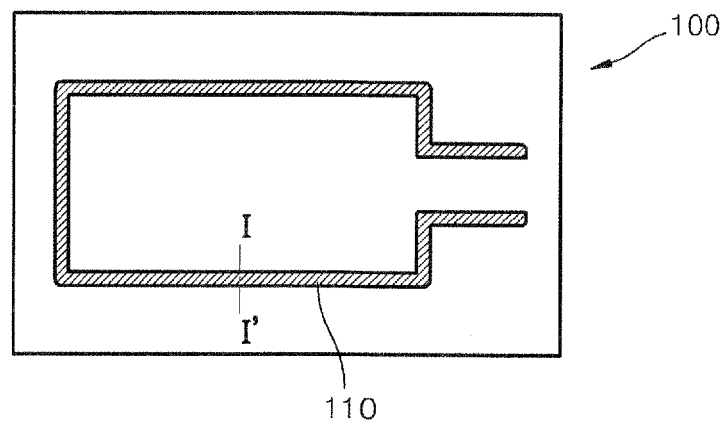
FIG. 1 is a schematic layout diagram of a seal line of a liquid crystal display (LCD) device, according to an exemplary embodiment of the present invention.

Reference will now be made in detail to exemplary embodiments of the present general inventive concept, examples of which are illustrated in the accompanying drawings. This invention may, however, be embodied in many different forms and should not be construed as limited to the embodiments set forth herein; rather, these embodiments are provided so that this disclosure will be thorough and complete, and will fully convey the scope of the invention to those of ordinary skill in the art. In the drawings, thicknesses of layers and regions are exaggerated for clarity. Like numbers refer to like elements throughout.

The term "seal region" used herein indicates a region of a liquid crystal display (LCD) device to which a seal is applied, the term "liquid crystal region" indicates a region in which liquid crystals are distributed, and the term "active region" indicates a region where light is emitted through a color filter.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. Alternatively, when an element is referred to as being "directly on" another element, there are no intervening elements present.

In order to clarify the present invention, elements extrinsic to the description are omitted from the details of this description, and like reference numerals refer to like elements throughout the specification.

In general, a liquid crystal panel of an LCD device includes liquid crystals injected between a device substrate and a color filter substrate, wherein a switching device, wiring, and a pixel electrode are disposed on the device substrate, and a color filter, a common electrode, and a black matrix are disposed on the color filter substrate.

Generally, the process of manufacturing the liquid crystal panel by assembling the device substrate and the color filter substrate is as follows. Orientation films are respectively coated on regions of the device substrate and color filter substrate that may contact liquid crystals, in order to allow uniform orientation of the liquid crystals. A seal is applied onto the device substrate to define a liquid crystal area in which the liquid crystals are to be injected, and column spacers are disposed on the color filter substrates to maintain a space between the device substrate and the color filter substrate. The device substrate and the color filter substrate are bound into an assembly, and the assembly is cut to produce products. These products are then subjected to the injection of the liquid crystals and encapsulation, thereby completing the manufacture of the liquid crystal panels.

In general, a black matrix is used in order to prevent light leakage at pixel boundaries where it is hard to control the orientation status of liquid crystals. For a higher brightness in LCD devices and lower power consumption by a back light, an aperture ratio indicating the ratio of the area of a light transmission region in a unit pixel to the total area of the unit pixel should be high. In order to increase the aperture ratio so as to meet the recent requirement for larger display devices, the area of an effective emission region of the liquid crystal panel to display images may be made as large as possible, while the area of a black matrix region may be made as small as possible.

However, if the black matrix region is small, a coating margin of the orientation film is reduced so that the orientation film may be coated on the seal region beyond the liquid crystal region. However, if the seal contacts the orientation film on either substrate, the adhesion between the device substrate and the color filter substrate may become weak, since the adhesion between the seal and the orientation film is weak.

FIG. 1 is a schematic layout diagram of a seal line of an LCD device 100 according to an exemplary embodiment of the present invention. Referring to FIG. 1, the seal line 110 is implemented as an open loop. However, the seal line 110 may be implemented as a closed loop when the LCD is filled with liquid crystals by one-drop filling (ODF). The seal line 110 confines liquid crystals between a first substrate and a second substrate, and binds the first and second substrates.

Figure 2:
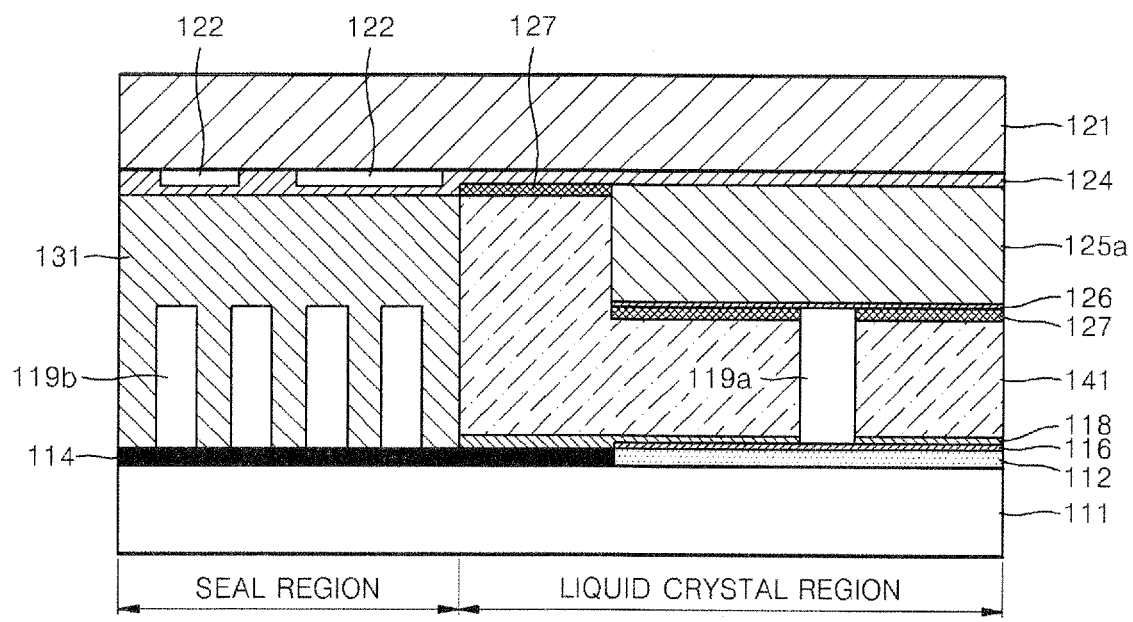
FIG. 2 is a cross-sectional view of the LCD device of FIG. 1, taken along a line I-I' of FIG. 1.

FIG. 2 is a cross-sectional view of the LCD device 100 of FIG. 1, taken along a line I-I' in FIG. 1. Referring to FIG. 2, a seal 131 may be in an edge region between a first substrate 111 and a second substrate 121. A liquid crystal layer 141 may be disposed in a region encompassed by the seal 131. Hereinafter, a region including the seal 131 is referred to as a "seal region", and a region including the liquid crystal layer 141 is referred to as a "liquid crystal region".

In particular, a color filter 112 and a black matrix 114 may be disposed on the first substrate 111. The color filter 112 may be located in the liquid crystal region. Red (R), green (G), and blue (B) light is obtained from the color filter 112 when light passes through the liquid crystal layer 141. Hereinafter, a region of the liquid crystal region through which light is emitted via the color filter 112 is referred to as an "active region".

The black matrix 114 lies on the seal region and an edge region of the liquid crystal region. The black matrix 114 prevents light leakage from pixel boundaries, including the edge region of the liquid crystal region, where it is hard to control the orientation status of liquid crystals.

A first electrode 116 may be disposed on the color filter 112. The first electrode 116 may be a common electrode. A first orientation film 118 may be disposed on the first electrode 116.

A column spacer 119a may be disposed on the first electrode 116 in the liquid crystal region. A plurality of seal column spacers 119b may be disposed on the black matrix 114 in the seal region. The column spacer 119a and the seal column spacers 119b may have a diameter of about 6 μm to about 40 μm. For example, the column spacer 119a may have a diameter of about 4 to 10 μm. The seal column spacers 119b may have a diameter of about 0.5 to about 2 μm. The column spacer 119a and the seal column spacers 119b may have a height of about 2 μm to about 5 μm. The column spacer 119a in the liquid crystal region maintains a cell gap between the first substrate 111 and the second substrate 121. The seal column spacers 119b in the seal region are fully buried in the seal 131, and thus are tightly bound to the seal 131. Thus, the seal column spacers 119b may tightly bind the first substrate 111 to the seal 131.

The first orientation film 118 may be limited to being on the first electrode 116, i.e., on the active region. Alternatively, the first orientation film 118 may be limited to being on the liquid crystal region beyond the active region. However, the first orientation film 118 may extend to the seal region. In this case, if the first orientation film 118 contacts the surface of the seal 131, the binding force between the seal 131 and the first substrate 111 may become weak, since the adhesion between the seal 131 and the first orientation film 118 is weak.

However, even when the first orientation film 118 extends to the seal region, the contact area between the first orientation film 118 and the seal 131 is small. This is because the first orientation film 118 may flow down and remain only on the black matrix 114, neither on the surfaces nor on sides of the seal column spacers 119b, due to the great heights of the seal column spacers 119b ranging from about 2 μm to about 5 μm. Thus, the small contact area between the seal 131 and the first orientation film 118 may lead to a smaller reduction in the binding force between the seal 131 and the first substrate 111. In addition, since the plurality of seal column spacers 119b buried in the seal 131 have a large contact area with respect to the seal 131, the seal column spacers 119b have a strong adhesion to the seal 131, which further strengthens the binding force between the seal 131 and the first substrate 111.

Circuit devices 122 may be disposed on a surface of the second substrate 121 facing the first substrate 111. A passivation layer 124 may be disposed to cover the circuit devices 133 and the second substrate 121. The circuit devices 122 may include a thin film transistor (TFT).

An organic layer 125a may be disposed on a region of the passivation layer 124 in the liquid crystal region. The organic layer 125a may be an insulating layer, which reduces a capacitance between the circuit devices 122 and electrodes 116 and 126, thereby resulting in reduced power consumption. The second electrode 126 is disposed on the organic layer 125a. Second orientation films 127 may be respectively disposed on the second electrode 126 and the passivation layer 124. The second electrode 126 may be a pixel electrode.

Figure 3:
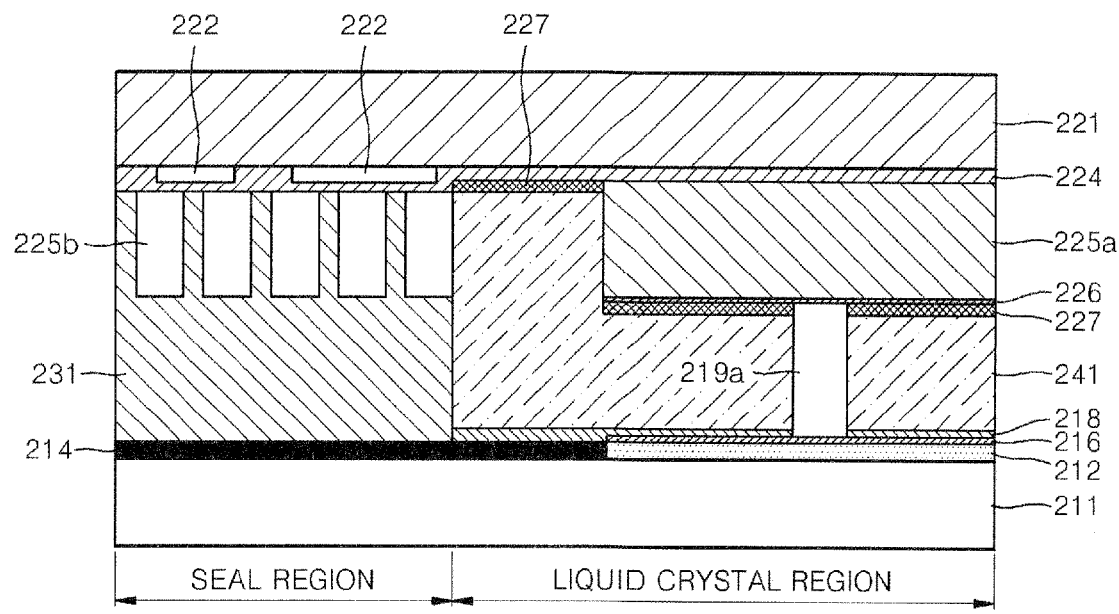
FIG. 3 is a cross-sectional view of an LCD device according to another embodiment of the present invention.

FIG. 3 is a cross-sectional view of an LCD device according to another exemplary embodiment of the present invention. Referring to FIG. 3, a seal 231 may be in an edge region between a first substrate 211 and a second substrate 221. A liquid crystal layer 241 may be disposed in a region encompassed by the seal 231.

In particular, a color filter 212 and a black matrix 214 may be disposed on the first substrate 211. The color filter 212 is located in the liquid crystal region. Red (R), green (G), and blue (B) light is obtained from the color filter 212 when light passes through the liquid crystal layer 241.

The black matrix 214 may be disposed on the seal region and an edge region of the liquid crystal region. The black matrix 214 prevents light leakage from pixel boundaries including the edge region of the liquid crystal region.

A first electrode 216 may be disposed on the color filter 212. The first electrode 216 may be a common electrode. A first orientation film 218 may be disposed on the first electrode 216.

A column spacer 219a may be disposed on the column filter 212 in the liquid crystal region. The column spacer 219a may have a diameter of about 4 μm to about 10 μm, and a height of about 2 μm to about 5 μm. The column spacer 219a maintains a cell gap between the first substrate 211 and the second substrate 221.

Circuit devices 222 may be disposed on a surface of the second substrate 221 facing the first substrate 211. A passivation layer 224 may be disposed to cover the circuit devices 222 and the second substrate 221. An organic layer 225a is disposed on a region of the passivation layer 224 in the liquid crystal region. A seal column organic layer 225b may be disposed on the passivation layer 224 in the seal region. The seal column organic layer 225b may have a diameter of about 0.5 μm to about 1 μm. The organic layer 225a and the seal column organic layer 225b may have a height of about 1 μm to about 3 μm. The organic layer 225a and the seal column organic layer 225b may be insulating layers, which reduce a capacitance between the circuit devices 222 and electrodes 216 and 226, thereby resulting in reduced power consumption.

The seal column organic layer 225b in the seal region may be in the form of a plurality of columns. The second electrode 226 may be disposed on the organic layer 225a. Second orientation films 227 may be disposed on the second electrode 226. Alternatively, the second orientation films 227 may be extended onto the passivation layer 224. The second electrode 226 may be a pixel electrode.

The second orientation films 227 may be limited to being on the liquid crystal region and not extending to the seal region. However, the second orientation films 227 may extend to the seal region in a coating process. In this case, if the second orientation film 227 contacts the surface of the seal 231, the binding force between the seal 231 and the second substrate 221 may become weak, since the adhesion between the seal 231 and the second orientation film 227 is weak.

However, even when the second orientation film 227 extends to the seal region, the contact area between the second orientation film 227 and the seal 231 is small. This is because the second orientation film 227 may flow down and remain only on the passivation layer 224 exposed by the seal column organic layer 225b, neither on the surfaces nor on the sides of the seal column organic layer 225b, due to the great heights of the seal column organic layer 225b ranging from about 1 µm to about 3 µm. Thus, the small contact area between the seal 231 and the second orientation film 227 may lead to a less reduction in the binding force between the seal 231 and the second substrate 221. In addition, since the seal column organic layer 225b, which is in the form of multiple columns, buried in the seal 231 has a large contact area with respect to the seal 231, the seal column organic layer 225b has a strong adhesion to the seal 231, which further strengthens the binding force between the seal 231 and the second substrate 221.

Figure 4:
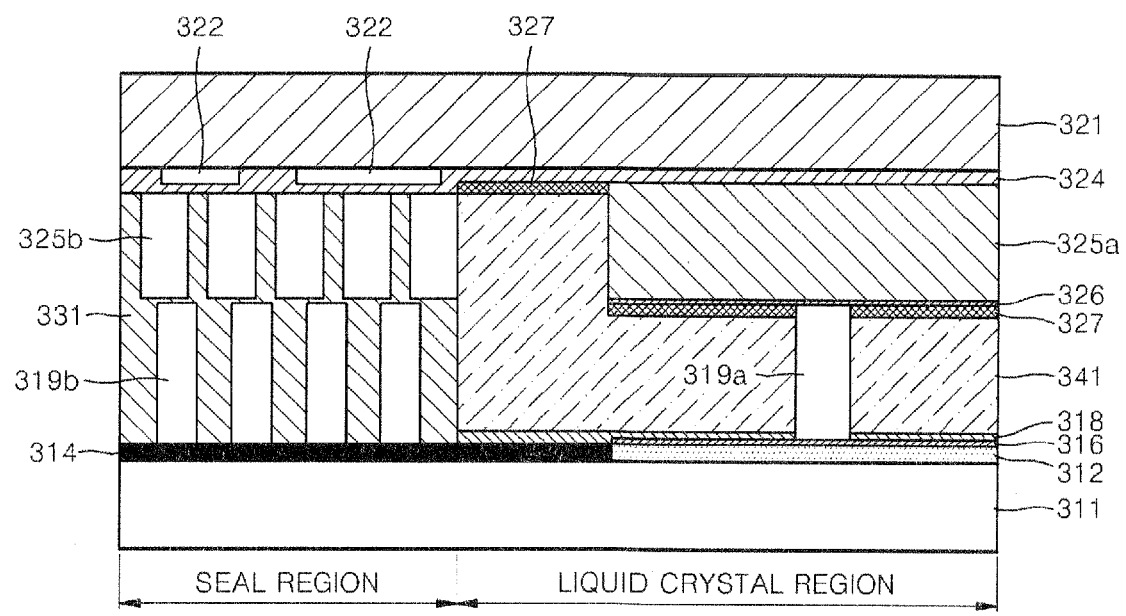
FIG. 4 is a cross-sectional view of an LCD device according to another embodiment of the present invention.

FIG. 4 is a cross-sectional view of an LCD device according to another exemplary embodiment of the present invention. Referring to FIG. 4, a seal 331 may be in an edge region between a first substrate 311 and a second substrate 321. A liquid crystal layer 341 may be disposed in a region encompassed by the seal 331.

In particular, a color filter 312 and a black matrix 314 may be disposed on the first substrate 311. The color filter 312 is located in the liquid crystal region. Red (R), green (G), and blue (B) light is obtained from the color filter 312 when light passes through the liquid crystal layer 341.

The black matrix 314 may lie on the seal region and an edge region of the liquid crystal region. The black matrix 314 prevents light leakage from pixel boundaries including the edge region of the liquid crystal region.

A first electrode 316 may be disposed on the color filter 312. The first electrode 316 may be a common electrode. A first orientation film 318 may be disposed on the first electrode 316.

A column spacer 319a may be disposed on the first electrode 316 in the liquid crystal region. A plurality of seal column spacers 319b may be disposed on the black matrix 314 in the seal region. The column spacer 319a and the seal column spacers 319b may have a diameter of about 6 µm to about 40 µm. For example, the column spacer 319a may have a diameter of about 4 to about 10 µm. The seal column spacers 319b may have a diameter of about 0.5 to about 2 µm. The column spacer 319a and the seal column spacers 319b may have a height of about 2 µm to about 5 µm. The column spacer 319a in the liquid crystal region maintains a cell gap between the first substrate 311 and the second substrate 321. The seal column spacers 319b in the seal region are fully buried in the seal 331, and thus, are tightly bound to the seal 331. Thus, the seal column spacers 319b may tightly bind the first substrate 311 to the seal 331.

The first orientation film 318 may be limited to being on the first electrode 316, i.e., on the active region. Alternatively, the first orientation film 318 may be limited to being on the liquid crystal region beyond the active region. However, the first orientation film 318 may extend to the seal region. In this case, if the first orientation film 318 contacts the surface of the seal 331, the binding force between the seal 331 and the first substrate 311 may become weak, since the adhesion between the seal 331 and the first orientation film 318 is weak.

However, even when the first orientation film 318 extends to the seal region, the contact area between the first orientation film 318 and the seal 331 is small. This is because the first orientation film 318 may flow down and remain only on the black matrix 314, neither on the surfaces nor on the sides of the seal column spacers 319b, due to the great heights of the seal column spacers 319b ranging from about 2 µm to about 5 µm. Thus, the small contact area between the seal 331 and the first orientation film 318 may lead to a less reduction in the binding force between the seal 331 and the first substrate 311. In addition, since the plurality of seal column spacers 319b buried in the seal 331 have a large contact area with respect to the seal 331, the seal column spacers 319b have a strong adhesion to the seal 331, which further strengthens the binding force between the seal 331 and the first substrate 311.

Circuit devices 322 may be disposed on a surface of the second substrate 321 facing the first substrate 311. A passivation layer 324 may be disposed to cover the circuit devices 322 and the second substrate 321. An organic layer 325a may be disposed on a region of the passivation layer 324 in the liquid crystal region. A seal column organic layer 325b is disposed on the passivation layer 324 in the seal region. The seal column organic layer 325b may have a diameter of about 0.5 µm to about 1 µm. The organic layer 325a and the seal column organic layer 325b may have a height of about 1 µm to about 3 µm. The organic layer 325a and the seal column organic layer 325b may be insulating layers, which reduce a capacitance between the circuit devices 322 and electrodes 316 and 326, thereby resulting in reduced power consumption.

The seal column organic layer 325b in the seal region may be in the form of a plurality of columns. The second electrode 326 may be disposed on the organic layer 325a. Second orientation films 327 may be disposed on the second electrode 326. Alternatively, the second orientation films 327 may be extended onto the passivation layer 324. The second electrode 326 may be a pixel electrode.

The second orientation films 327 may be limited to being on the liquid crystal region, and not to extend to the seal region. However, the second orientation films 327 may extend to the seal region in a coating process. In this case, if the second orientation film 327 contacts the surface of the seal 331, the binding force between the seal 331 and the second substrate 321 may become weak, since the adhesion between the seal 331 and the second orientation film 327 is weak.

However, even when the second orientation film 327 extends to the seal region, the contact area between the second orientation film 327 and the seal 331 is small. This is because the second orientation film 327 may flow down and remain only on the passivation layer 324 exposed by the seal column organic layer 325b, neither on the surfaces nor on the sides of the seal column organic layer 325b, due to the great heights of the seal column organic layer 325b ranging from about 1 µm to about 3 µm. Thus, the small contact area between the seal 331 and the second orientation film 327 may lead to a less reduction in the binding force between the seal 331 and the second substrate 321. In addition, since the seal column organic layer 325b, which is in the form of multiple columns, buried in the seal 331 has a large contact area with respect to the seal 331, the seal column organic layer 325b has a strong adhesion to the seal 331, which further strengthens the binding force between the seal 331 and the second substrate 321.

FIGS. 5A through 5H are cross-sectional views for describing a method of manufacturing an LCD device, according to another exemplary embodiment of the present invention.

Figure 5A:
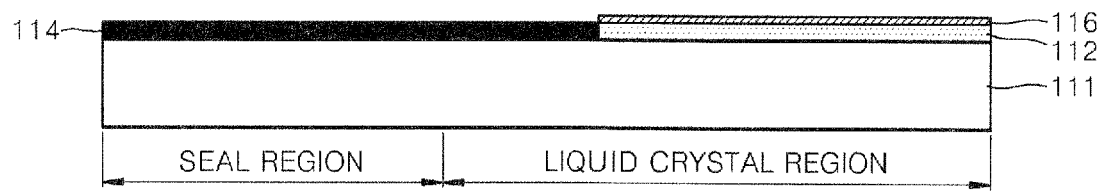
FIGS. 5A through 5H are cross-sectional views for describing a method of manufacturing an LCD device, according to another exemplary embodiment of the present invention.

Referring to FIG. 5A, a color filter 112 and a black matrix 114 are formed on a first substrate 111. Then, a first electrode 116 is formed on the color filter 112. The first substrate 111 may be formed of a transparent material, for example, glass or plastic. The first electrode 116 may be formed as a transparent electrode by using indium tin oxide (ITO) or indium zinc oxide (IZO).

Figure 5B:
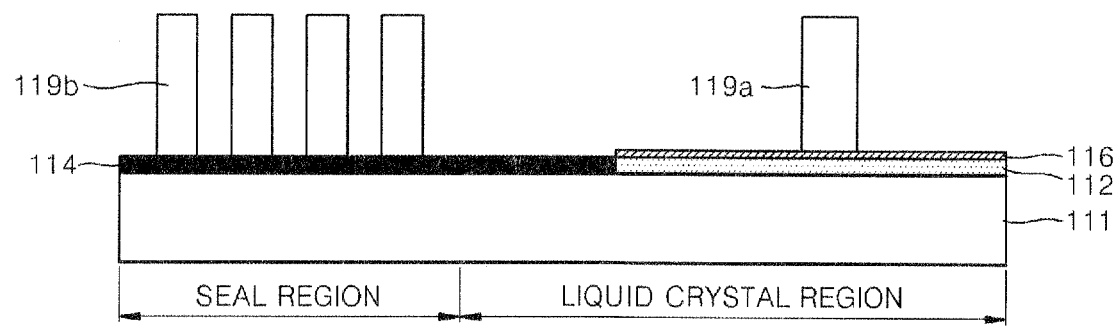

Referring to FIG. 5B, a column spacer 119a may be formed on the first electrode 116 in an active region. Seal column spacers 119b may be formed on the black matrix 114 in a seal region. The column spacer 119a and the seal column spacers 119b may be formed to a thickness of about 2 to about 5 μm by a photolithography process.

Figure 5C:
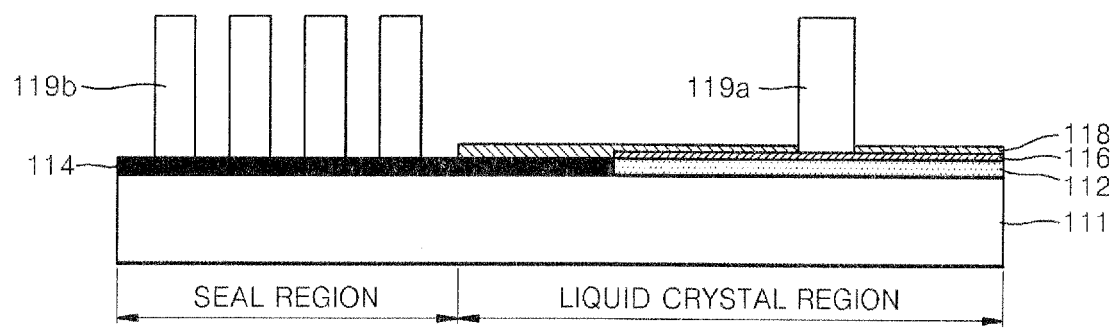
Figure 5D:
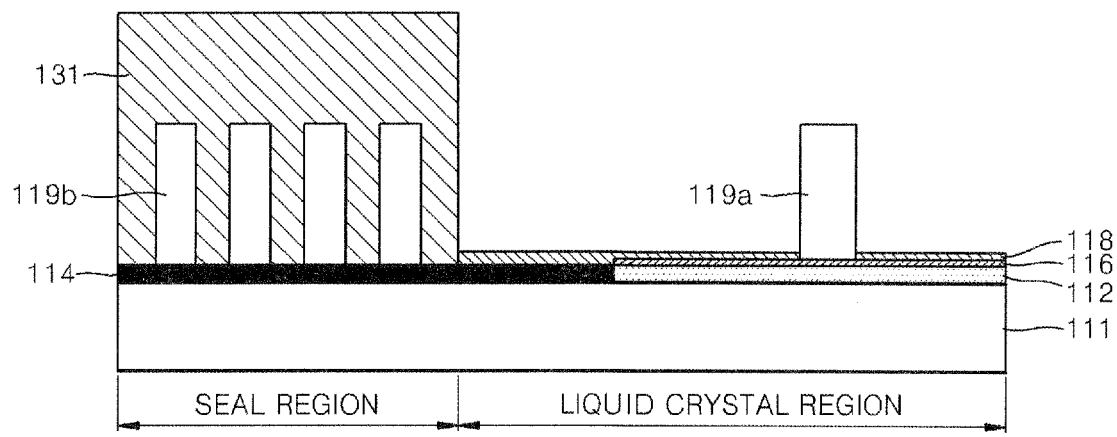

Referring to FIG. 5C, a first orientation film 118 is formed on the first electrode 116. The first orientation film 118 may be formed by coating, for example, a polyimide (PI) to a thickness of about 400 Å to about 1000 Å. In this regard, since the heights of the column spacer 119a and the seal column spacers 119b are about 20 times greater than the height of the first orientation film 118, sidewalls of the column spacer 119a and the seal column spacers 119b may not be coated with the PI. In addition, the top surfaces of the seal column spacers 119b are not substantially flat, so that the PI may flow down and does not remain on the top surfaces of the seal column spacers 119. In other words, the first orientation film 118 is not formed on the top surfaces of the seal column spacers 119b. Referring to FIG. 5D, after the first orientation film 118 is formed, a seal 131 is formed in a seal region of the first substrate 111. The seal 131 may be formed of a UV-curable polymer. The first orientation film 118 may be formed within the liquid crystal region. However, the first orientation film 118 may extend to the seal region due to a processing margin. However, even when the first orientation film 118 is formed to extend to the seal region, a contact area between the first orientation film 118 and the seal 133 may be small, since the first orientation film 118 is not coated on the top surfaces of the seal column spacers 119b.

Figure 5E:
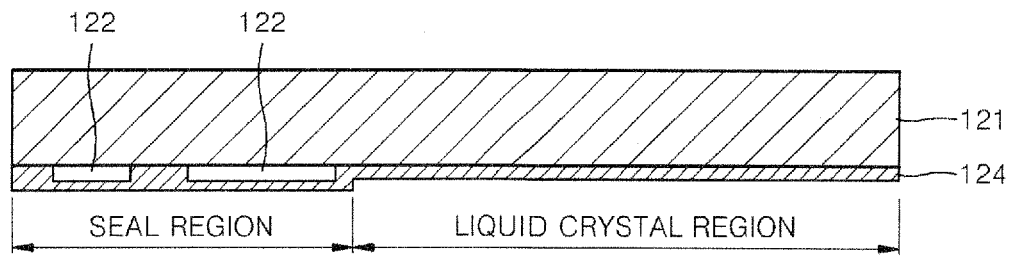

Referring to FIG. 5E, circuit devices 122 are formed on a second substrate 121, which is separate from the first substrate 111. Then, a passivation layer 124 may be formed on the circuit devices 122 and the second substrate 121. The circuit devices 122 may include a switching TFT.

Figure 5F:
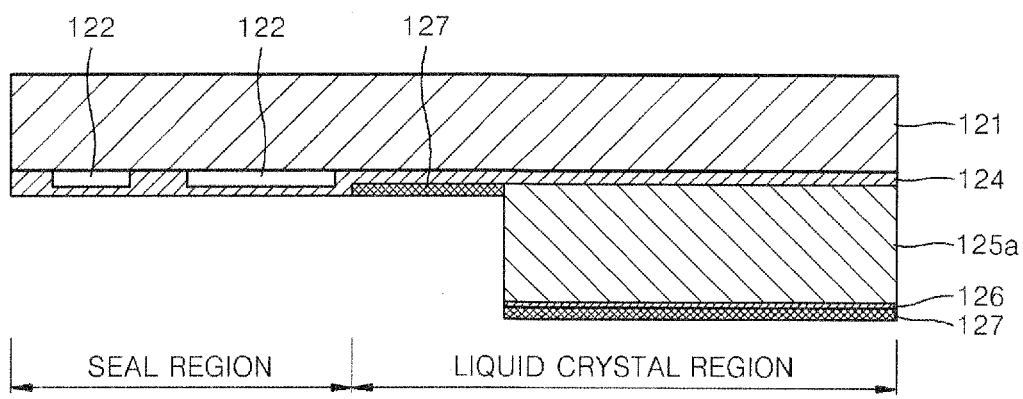

Referring to FIG. 5F, an organic layer 125a is formed on a region of the passivation layer 124 in the liquid crystal region. A second electrode 126 is formed on the organic layer 125a. The organic layer 125a may be formed to a thickness of about 1 μm to about 3 μm. The second electrode 126 may be formed as a transparent electrode. Alternatively, the second electrode 126 may be formed as a reflective electrode to manufacture a reflective LCD device. Second orientation films 127 may be respectively formed on the second electrode 126 and the passivation layer 124.

Figure 5G:
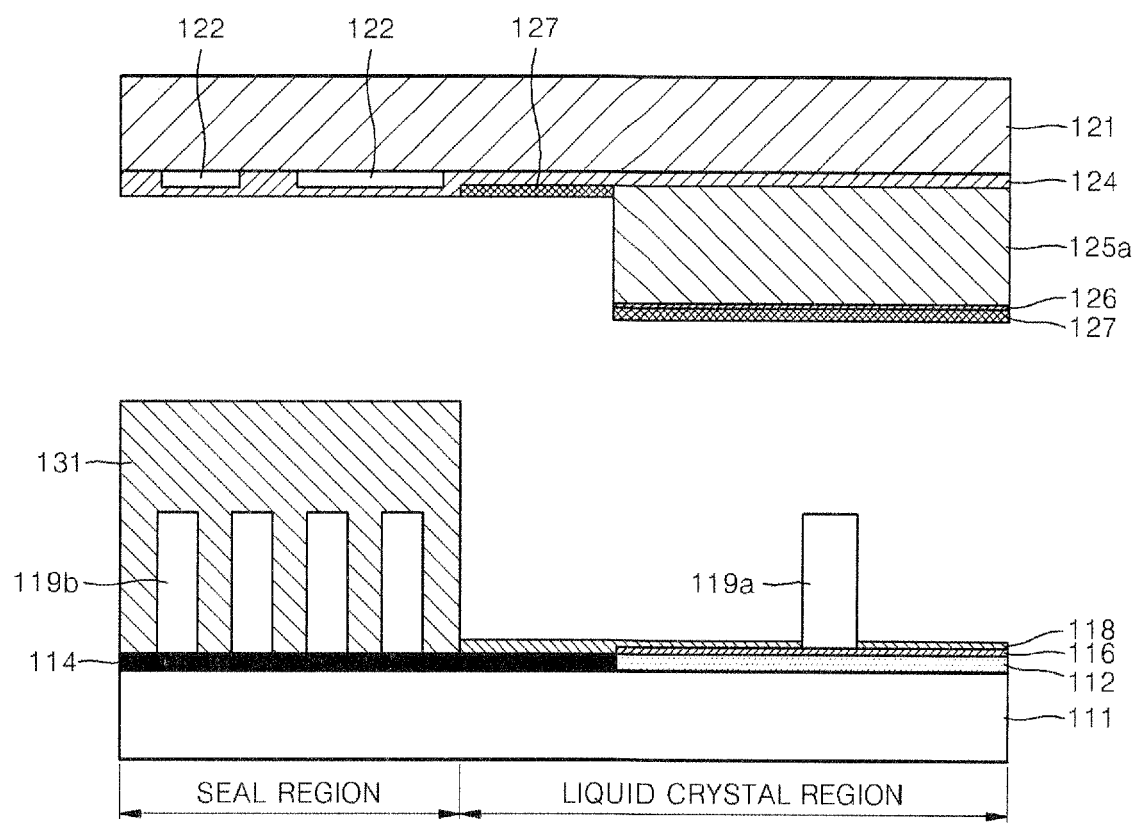

Referring to FIG. 5G, the first substrate 111 with the structure of FIG. 5D and the second substrate 121 with the structure of FIG. 5F are bound together. Then, the seal region may be selectively irradiated with UV to cure the seal 131, while the liquid crystal region is covered so as not to be exposed to UV.

Figure 5H:
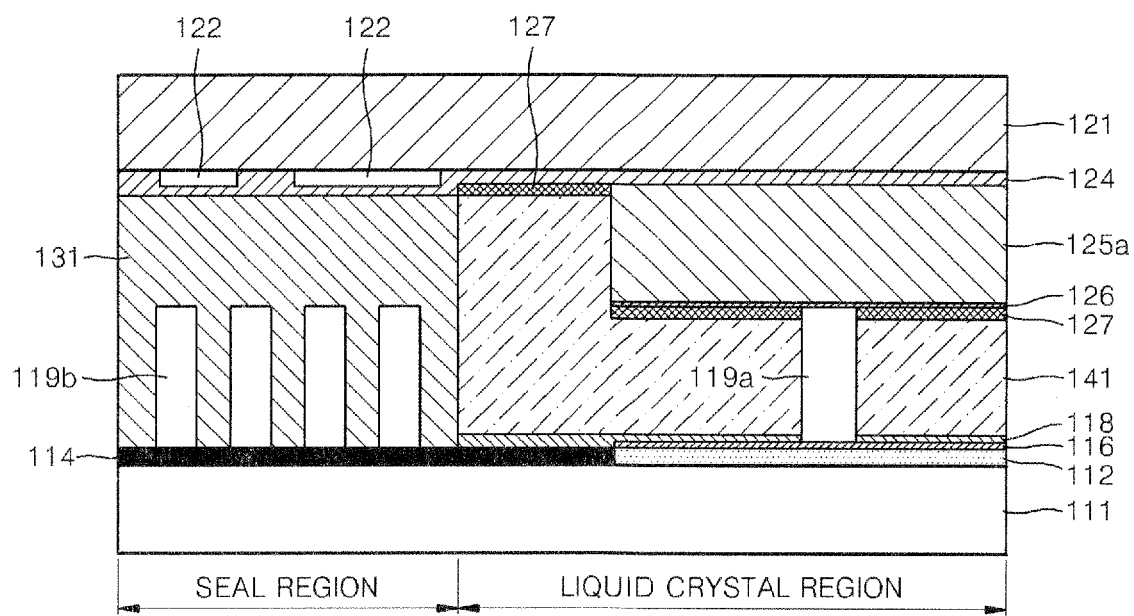

Referring to FIG. 5H, liquid crystals are injected into a space in the liquid crystal region that is defined by the seal 131 between the first substrate 111 and the second substrate 121, to form a liquid crystal layer 141.

Although in the current embodiment the seal 131 is formed on the first substrate 111, the seal 131 may be formed on the second substrate 121.

FIGS. 6A through 6H are cross-sectional views for describing a method of manufacturing an LCD device, according to another exemplary embodiment of the present invention. The embodiment illustrated in FIGS. 6A through 6H differs from the embodiment illustrated in FIGS. 5A through 5H in that a plurality of seal column organic layers are formed, instead of the column spacers, in the seal region.

Figure 6A:
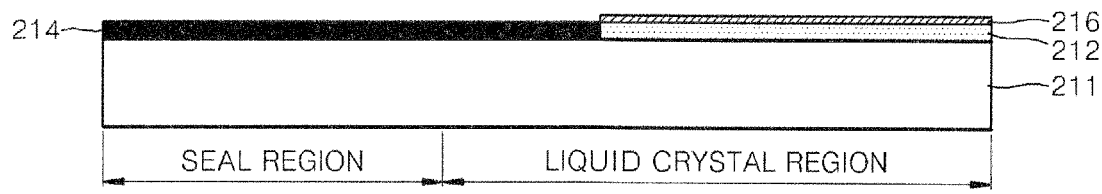
FIGS. 6A through 6H are cross-sectional views for describing a method of manufacturing an LCD device, according to another exemplary embodiment of the present invention.

Referring to FIG. 6A, a color filter 212 and a black matrix 214 may be formed on a first substrate 211. Then, a first electrode 216 is formed on the color filter 212. The first substrate 211 may be formed of a transparent material, for example, glass or plastic. The first electrode 216 may be formed as a transparent electrode by using ITO or IZO.

Figure 6B:
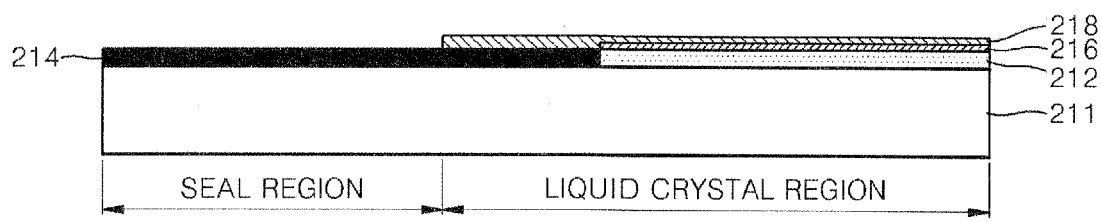

Referring to FIG. 6B, a first orientation film 218 is formed on the first electrode 216 in an active region and on the black matrix 214 in a seal region. The first orientation film 218 may be formed by coating, for example, a polyimide (PI) to a thickness of about 400 Å to about 1000 Å.

Figure 6C:
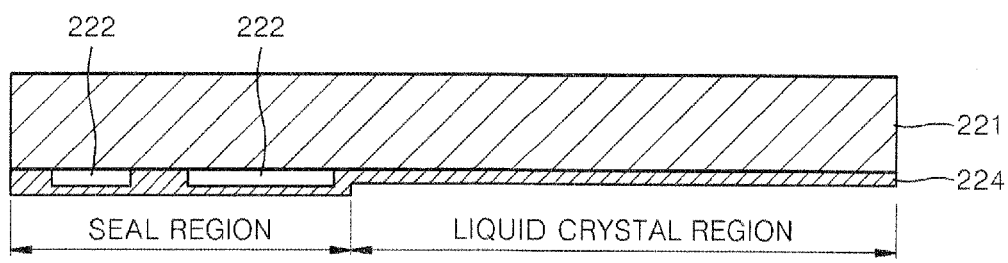

Referring to FIG. 6C, circuit devices 222 are formed on a second substrate 222, which is separate from the first substrate 211. Then, a passivation layer 224 may be formed on the circuit devices 222 and the second substrate 221. The circuit devices 222 may include a switching TFT.

Figure 6D:
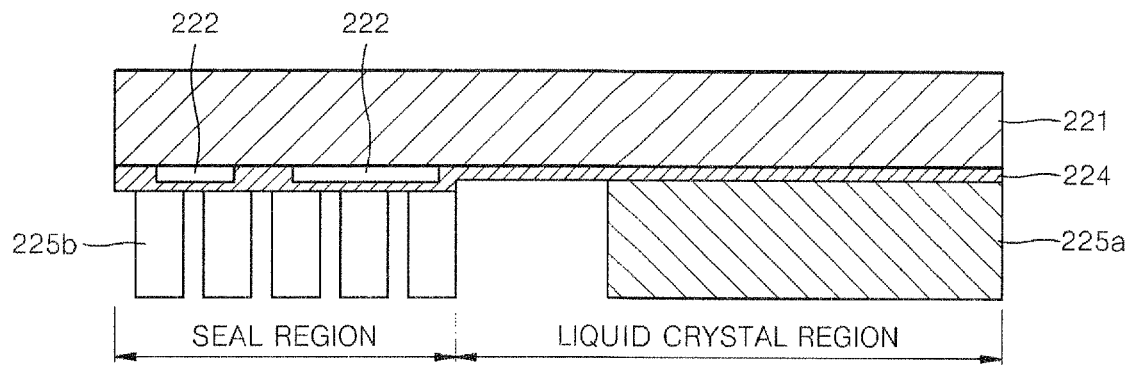

Referring to FIG. 6D, an organic layer 225a is formed on a region of the passivation layer 224 in the liquid crystal region, and a seal column organic layer 225b may be formed on a region of the passivation layer 224 in the seal region. The seal column organic layer 325b in the seal region may be in the form of a plurality of columns. The organic layer 225a and the seal column organic layer 225b may have a height of about 1 μm to about 3 μm. A second electrode 226 is formed on the organic layer 225a in the liquid crystal region. The second electrode 226 may be formed as a transparent electrode or as a reflective electrode.

Figure 6E:
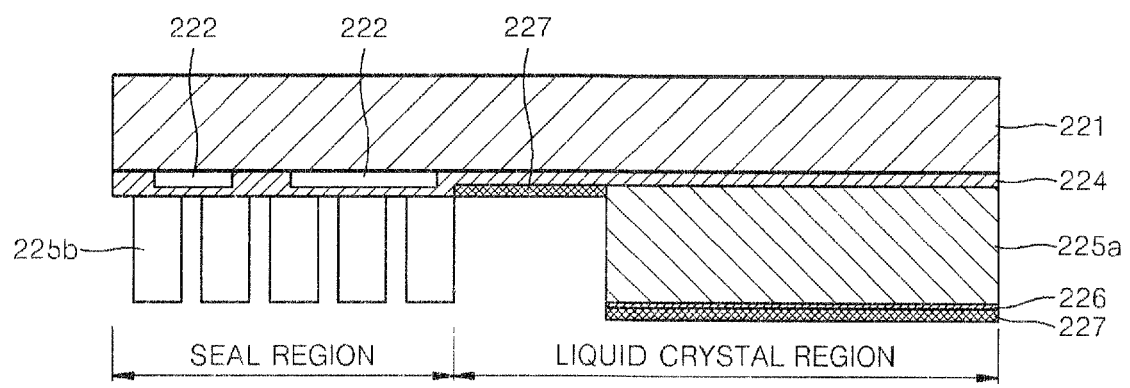

Referring to FIG. 6E, second orientation films 227 may be respectively formed on the second electrode 226 and the passivation layer 224. The second orientation films 227 may be formed by coating, for example, PI to a thickness of about 400 Å to about 1000 Å. In this regard, since the heights of the organic layer 225a and the seal column organic layer 225b are about 20 times greater than the height of the second orientation film 227, sidewalls of the seal column organic layer 225b may not be coated with the PI. The second orientation film 227 may not be formed on the top surface of the seal column organic layer 225b.

Figure 6F:
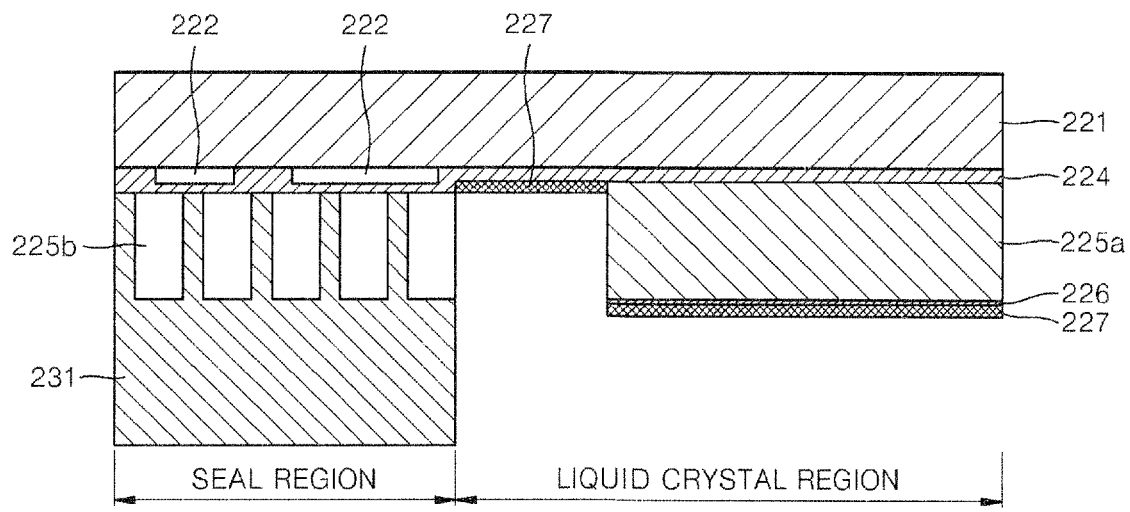

Referring to FIG. 6F, after the second orientation film 227 is formed, a seal 231 may be formed in a seal region of the second substrate 221. The seal 231 may be formed of a UV-curable polymer. The second orientation film 227 may be formed within the liquid crystal region. However, the second orientation film 227 may extend to the seal region due to a processing margin. However, even when the first orientation film 227 is formed to extend to the seal region, a contact area between the first orientation film 225 and the seal 133 may be small, since the first orientation film 227 is not coated on the top surfaces of the seal column spacers 119b.

Figure 6G:
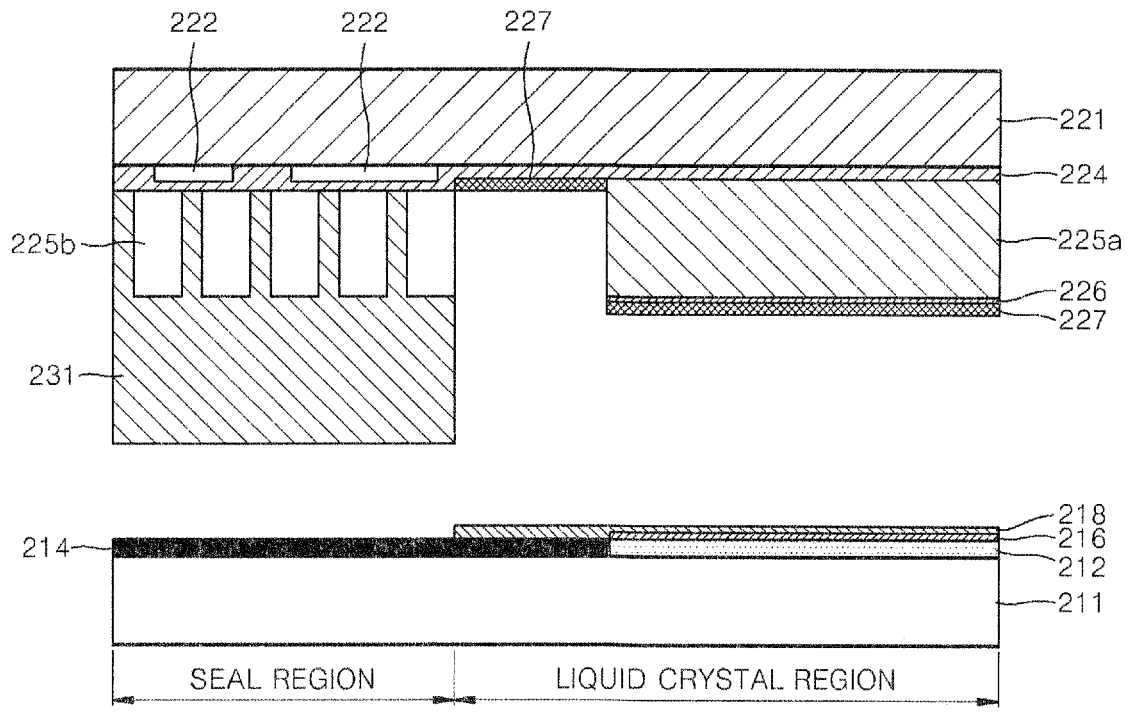

Referring to FIG. 6G, the first substrate 211 with the structure of FIG. 6B and the second substrate 221 with the structure of FIG. 6F are bound together. Then, the seal region may be selectively irradiated with UV to cure the seal 231, while the liquid crystal region may be covered so as not to be exposed to UV.

Figure 6H:
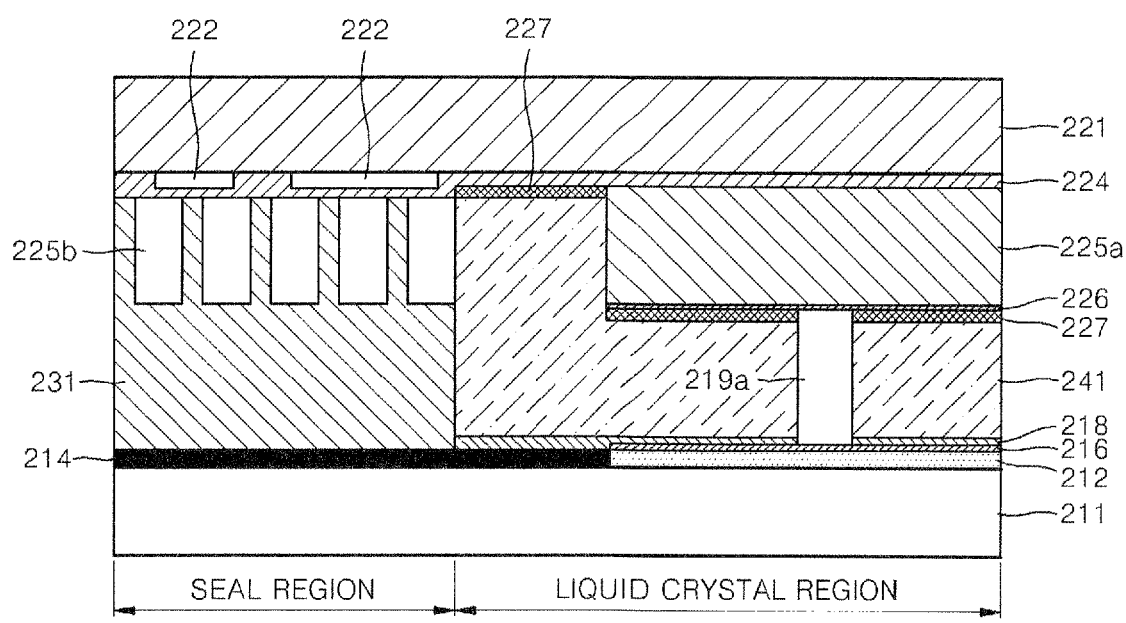

Referring to FIG. 6H, liquid crystals may be injected into a space in the liquid crystal region that is defined by the seal 231 between the first substrate 211 and the second substrate 221, to form a liquid crystal layer 241.

Although in the current embodiment the seal 231 is formed on the second substrate 221, the seal 231 may be formed on the first substrate 211.

FIGS. 7A through 7H are cross-sectional views for describing a method of manufacturing an LCD device, according to another exemplary embodiment of the present invention. The embodiment illustrated in FIGS. 7A through 7C differs from the embodiment illustrated in FIGS. 5A through 5H and the embodiment illustrated in FIGS. 6A through 6H in that both column spacers and seal column spacers are formed in the seal region.

Figure 7A:
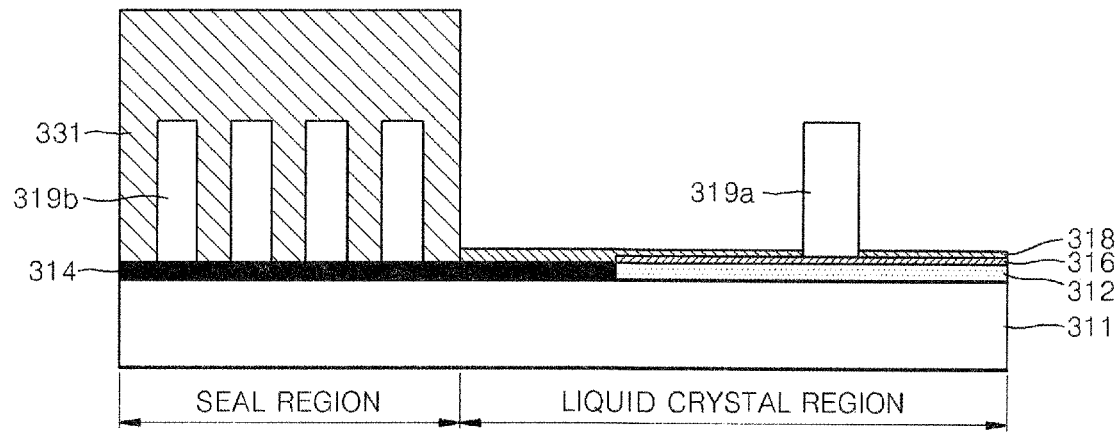
FIGS. 7A through 7D are cross-sectional views for describing a method of manufacturing an LCD device, according to another exemplary embodiment of the present invention.

Referring to FIG. 7A, a color filter 312, a black matrix 314, a first electrode 316, column spacers 319a and 319b, a first orientation film 318, and a seal 331 may be formed on a first substrate 311, as described with reference to FIGS. 5A through 5D.

In particular, the color filter 312 and the black matrix 314 may be formed on the first substrate 312. Then, the first electrode 316 may be formed on the color filter 312. The column spacer 319a may be formed on the first electrode 316 in an active region. The seal column spacers 319b may be formed on the black matrix 314 in a seal region. The column spacer 319a and the seal column spacers 319b may be formed to a thickness of about 2 to about 5 µm by a photolithography process.

The first orientation film 318 may be formed on the first electrode 316. The first orientation film 318 may be formed by coating, for example, PI to a thickness of about 400 Å to about 1000 Å. In this regard, since the heights of the column spacer 319a and the seal column spacers 319b are about 20 times greater than the height of the first orientation film 318, sidewalls of the column spacers 319a and the seal column spacers 319b may not be coated with the PI.

After the first orientation film 318 is formed, the seal 331 may be formed in the seal region of the first substrate 311. The seal 331 may be formed of a UV-curable polymer. The first orientation film 318 may be formed within the liquid crystal region. However, the first orientation film 318 may extend to the seal region due to a processing margin. However, even when the first orientation film 318 is formed to extend to the seal region, a contact area between the first orientation film 318 and the seal 133 may be small, since the first orientation film 318 is not coated on the top surfaces of the seal column spacers 319b.

Figure 7B:
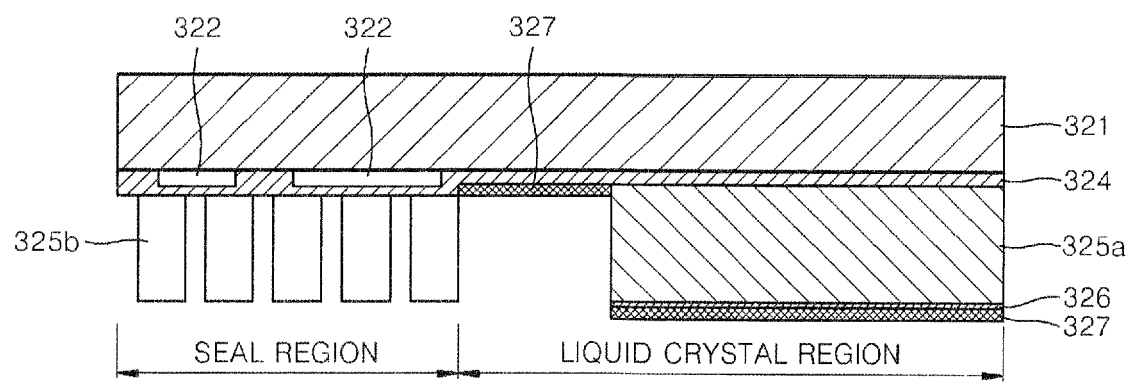

Referring to FIG. 7B, as described with reference to FIGS. 6C through 6F, circuit devices 322, a passivation layer 324, an organic layer 325a, a seal column organic layer 325b, a second electrode 326, and second orientation films 317 may be formed on a second substrate 321, which is separate from the first substrate 311. Since the seal 331 is formed on the first substrate 311, as described above, no seal is formed on the second substrate 321. However, optionally the seal 331 may be formed on the second substrate 321, rather than on the first substrate 311.

In particular, the circuit devices 321 may be formed on the second substrate 322, and the passivation layer 324 may be formed on the circuit devices 322 and the second substrate 321. Referring to FIG. 7B, the organic layer 325a may be formed on a region of the passivation layer 324 in the liquid crystal region, and the seal column organic layer 325b is formed on a region of the passivation layer 324 in the seal region. The seal column organic layer 325b in the seal region may be in the form of a plurality of columns. The organic layer 325a and the seal column organic layer 325b may have a height of about 1 µm to about 3 µm. The second electrode 326 may be formed on the organic layer 325a in the liquid crystal region.

The second orientation films 327 may be respectively formed on the second electrode 326 and the passivation layer 324. The second orientation films 327 may be formed by coating, for example, PI to a thickness of about 400 Å to about 1000 Å. In this regard, since the heights of the seal column organic layer 325b is about 20 times greater than the height of the second orientation films 327, sidewalls of the seal column organic layer 225b may not be coated with the PI. In other words, the second orientation film 327 may not be formed on the top surface of the seal column organic layer 325b.

Figure 7C:
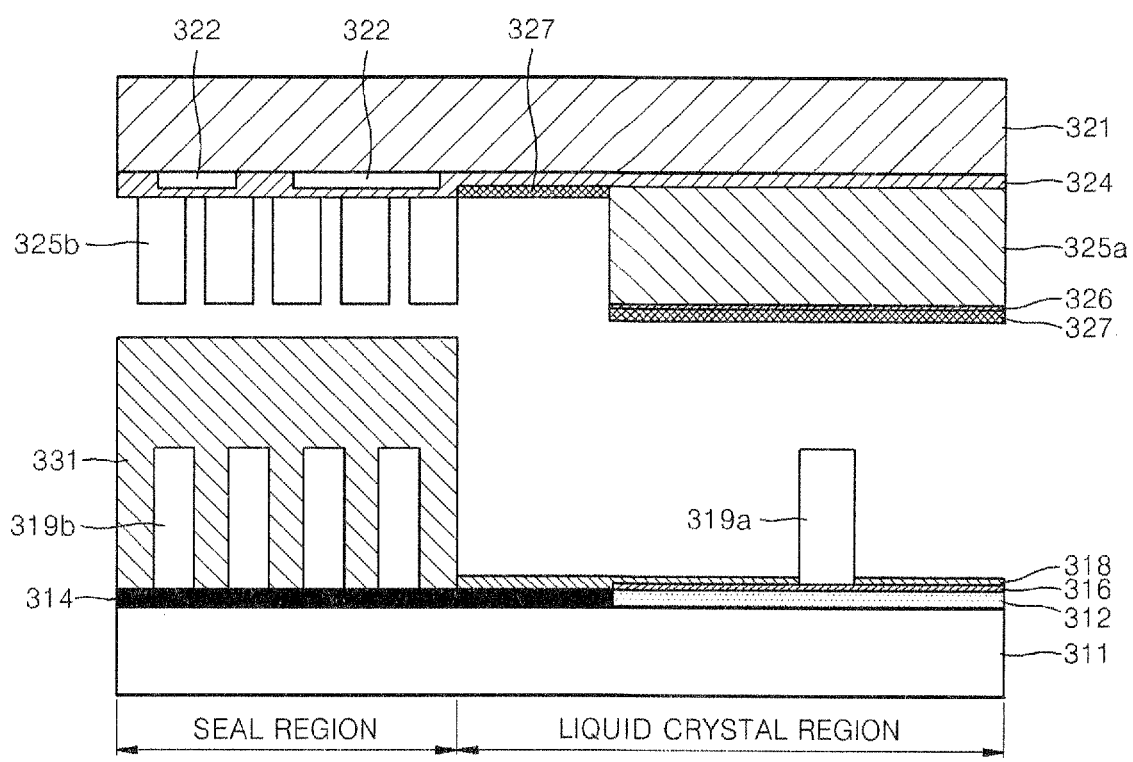

Referring to FIG. 7C, the first substrate 311 with the structure of FIG. 7A and the second substrate 321 with the structure of FIG. 7B are bound together. Then, the seal region may be selectively irradiated with UV to cure the seal 331, while the liquid crystal region may be covered so as not to be exposed to UV.

Figure 7D:
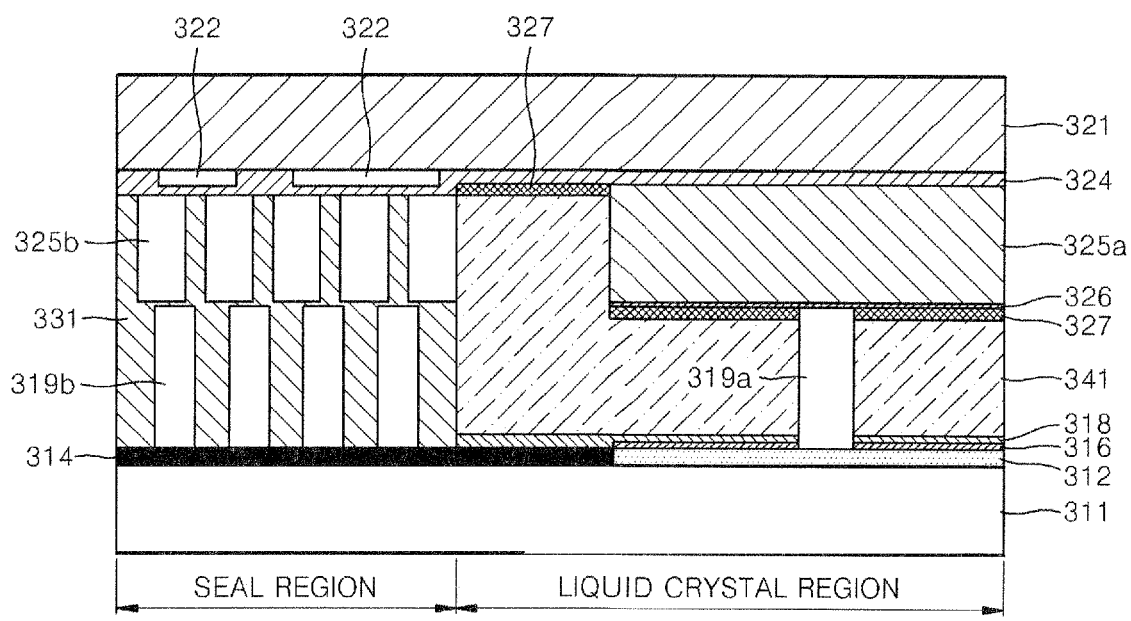

Referring to FIG. 7D, liquid crystals are injected into a space in the liquid crystal region that is defined by the seal 331 between the first substrate 311 and the second substrate 321, to form a liquid crystal layer 341.

As described above, according to embodiments of the present invention, a plurality of seal column spacers may be formed in a seal region of a first substrate. Alternatively, a plurality of seal column organic layers may be formed in a seal region of a second substrate. The seal column spacers or the seal column organic layers are bound with a seal, thereby improving the adhesion between the seal and the first substrate or the second substrate, and the binding force between the first and second substrates.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A liquid crystal display (LCD) device, comprising:
a first substrate and a second substrate, each of the first and second substrate having a surface opposite to each other and each of the first and second substrate including a seal region and a liquid crystal region;
a first substrate structure having a black matrix on the surface of the first substrate opposite to the second substrate, a color filter next to the black matrix, a first electrode on the color filter, and a first orientation film on the first electrode;
a second substrate structure having a circuit device disposed on the surface of the second substrate opposite to the black matrix, an organic layer disposed on the second substrate opposite to the color filter, a passivation layer on the circuit device and the second substrate, and underlying the organic layer, a plurality of seal column organic layers each having a column shape directly on the passivation layer, wherein the plurality of seal column organic layers are adjacent from each other; a second electrode on the organic layer, and a second orientation film on the second electrode;
a seal disposed between the seal regions of the first substrate and the second substrate to bind the first substrate structure and the second substrate structure, the plurality of seal column organic layers is buried in the seal with each of the plurality of seal column organic layers having a height shorter than a height of the seal, and one end of each of the plurality of seal column organic layers solely contacts the seal; and
a liquid crystal layer filling a space between the first substrate structure and the second substrate structure in the liquid crystal region.

2. The LCD device of claim 1, wherein the seal column organic layers have a diameter of about 0.5 µm to about 1 µm.

3. The LCD device of claim 1, wherein the seal column organic layers have a height of about 1 µm to about 3 µm.

4. The LCD device of claim 1, wherein the first orientation film and the second orientation film have a height of about 400 Å to about 1000 Å.

* * * * *